United States Patent [19]
Balram et al.

[11] Patent Number: 6,034,733
[45] Date of Patent: Mar. 7, 2000

[54] TIMING AND CONTROL FOR DEINTERLACING AND ENHANCEMENT OF NON-DETERMINISTICALLY ARRIVING INTERLACED VIDEO DATA

[75] Inventors: Nikhil Balram, Mountain View; Sai-Kit Tong, San Jose; Takatoshi Ishii; Lutz Filor, both of Sunnyvale; Qiang Li, Fremont; Thomas C. Young, Foster City; Julie Zhang, San Jose, all of Calif.

[73] Assignee: S3 Incorporated, Santa Clara, Calif.

[21] Appl. No.: 09/127,117

[22] Filed: Jul. 29, 1998

[51] Int. Cl.[7] .................................................. H04N 7/01
[52] U.S. Cl. ................................. 348/448; 348/452
[58] Field of Search .............................. 348/450, 452, 348/448, 699–701, 604, 572, 625; 345/132, 133, 154, 474, 475, 302, 523

[56] References Cited

U.S. PATENT DOCUMENTS

| | | | |
|---|---|---|---|
| 4,982,280 | 1/1991 | Lyon et al. ............................... | 358/105 |
| 4,992,869 | 2/1991 | Samad et al. ............................ | 348/452 |
| 5,237,414 | 8/1993 | Faroudja ................................. | 358/162 |
| 5,291,280 | 3/1994 | Faroudja et al. ........................ | 348/416 |
| 5,305,120 | 4/1994 | Faroudja ................................. | 348/624 |
| 5,347,314 | 9/1994 | Faroudja et al. ........................ | 348/448 |
| 5,428,398 | 6/1995 | Faroudja ................................. | 348/452 |
| 5,504,531 | 4/1996 | Knee ....................................... | 348/452 |
| 5,534,935 | 7/1996 | Kawai et al. ............................ | 348/452 |
| 5,751,378 | 5/1998 | Chen et al. .............................. | 348/700 |

OTHER PUBLICATIONS

"Displaying Interleaved Video with VPE: Bob and Weave," Jul. 20, 1998, p. 1 of 1.
"Bob Method," Jul. 20, 1998, p. 1 of 1.
"Weave Method," Jul. 20, 1998, p. of 1 of 1.

Primary Examiner—Victor R. Kostak
Attorney, Agent, or Firm—Fenwick & West LLP

[57] ABSTRACT

A video deinterlacing system receives interlaced video data at a non-deterministic rate and generates non-interlaced data as a function of the interlaced video data. The system includes processing units, some of which require clocking rates that differ from clocking rates required by other processing units. A timing generator responds to a base clock and to a data valid signal, that indicates arrival of a portion of the interlaced video data, to cause generation of a plurality of enable signals. Each of the enable signals operate to enable a corresponding one of the clocking rates required by the processing units. Video capture can be performed by causing capture of video frames that meet or exceed a specified quality level. The quality of the captured, still image, video can be improved by disabling certain enhancement functions performed to improve moving video images.

40 Claims, 7 Drawing Sheets

TIMING AND CONTROL FOR DEINTERLACING AND ENHANCEMENT OF NON-DETERMINISTICALLY ARRIVING INTERLACED VIDEO DATA

FIELD OF THE INVENTION

This invention pertains generally to the field of computer graphics and more particularly to de-interlacing and enhancement of video data for display by digital computer systems.

BACKGROUND OF THE INVENTION

Video data originally developed for television screens must be reformatted before it can be displayed on most computer displays. Television screens typically require data in 2:1 interlaced format, which means a full frame of data is comprised of two spatially and temporally offset fields, typically referred to as odd and even fields. Computer displays typically require non-interlaced data. Displaying video data produced for standard televisions on personal computers therefore generally requires that the video data be converted from an interlaced format to a non-interlaced format.

The two most common conversion techniques are spatial line doubling and field recombining. Spatial line doubling, which is embodied in a technique referred to as "Bob" supported by the Microsoft Corporation, involves taking one field at a time and spatially interpolating to obtain the missing lines, usually by averaging the line above and below each missing one. Field recombining, which is embodied in a technique referred to as "Weave" supported by the Microsoft Corporation, involves interleaving both fields back together to get a spatially complete frame. The former approach ("Bob") is better suited for video with high motion content but produces a clearly visible loss of resolution for relatively static scenes. The latter technique ("Weave") is better suited for relatively static scenes but produces highly objectionable artifacts called feathering or ghosting when significant motion is present. Current and past commercially available Personal Computer (PC) systems have generally been unable to determine whether or not a live video source has motion, hence "Bob" is typically used because it produces less objectionable artifacts.

Certain conversion techniques produce much higher quality images by detecting the presence of motion in local areas of each field and using a motion-weighted average of the spatially and temporally interpolated values computed for the missing pixels. When the presence of film converted to video is detected, even higher quality is produced by recombining the appropriate fields. Such techniques produce a much higher quality video output than the Bob or Weave approaches described above.

Such techniques however, have traditionally only been available for the PC user in the form of a standalone display processor box. An example of such a display processor box is the Faroudja LD200 product by Faroudja Incorporated. Such a system operates as a standalone real-time display processor and is independent of the constraints and operating conditions, including timing and bandwidth constraints, of a typical PC graphics subsystem. Its timing, control and programming mechanisms are therefore decoupled from the PC environment. A number of techniques exist to perform processing on the video data to produce line-doubled and enhanced output, but the accompanying programming, and timing and control mechanisms are appropriate for a standalone box and not for an integrated core inside a PC's graphics accelerator.

De-interlacing by line-doubling inherently involves creation of additional data, including at least two continuous streams that are related by a multiple of a base clock. Additional clock rates are required by varying widths, multiplexing and demultiplexing of chroma at different stages, upsampling for enhancement, and downsampling for output to constrained channel. It is typical for traditional standalone video systems like the Faroudja LD 200 to operate continuously on the incoming real-time video, for example 525 lines per frame for NTSC, and use various clocks that are multiples of the base video clock to control the data. This type of mixing of control and clocking is very difficult to handle in the so-called back-end processing (route & place, design for testability, design rules checking) necessary in an integrated core that is part of a complex graphics accelerator ASIC (Application Specific Integrated Circuit). In addition, in such standalone systems there is no provision for non-deterministic arrival of data, as is often the case for PC subsystems that use shared buses, or non-deterministic processing of data downstream when it is merged with other data streams such as graphics. There is also no provision for frame-by-frame interaction that is possible in a PC environment and which adds significant value by providing tighter coupling of the multiple media.

In summary, conventional motion-adaptive video de-interlacing and enhancement modules use isochronous, clock-based controls that are suitable for standalone display processors, but have significant deficiencies in the context of a PC multimedia subsystem, especially if the video processing functions are embedded inside a multimedia controller such as the ViRGE graphics accelerator available from S3 Incorporated. Typical standalone display processors with de-interlacing and enhancement capability are not designed for tight coupling with a PC system and therefore do not have the mechanisms to facilitate such interaction. Conventional PC video de-interlacing modules use very simple processing which does not pose the kinds of problems or options that a sophisticated motion-adaptive de-interlacing and enhancement module does, hence the simple timing and control mechanisms do not extend to the latter.

SUMMARY OF THE INVENTION

In accordance with a principal object of the present invention, a robust and flexible timing interface is provided to control a set of video streams related by multiples of a base clock, as would typically be produced by a high quality video de-interlacing and enhancing system, in a manner that is optimal for a deep-submicron integrated core suitable for use inside a PC multimedia accelerator, or a video processor integrated circuit (IC) that works in conjunction with a PC multimedia accelerator. In a first aspect of the invention, a video de-interlacing system for receiving interlaced video data at a non-deterministic rate and for generating non-interlaced data as a function of the interlaced video data comprises a plurality of processing units, at least some of the processing units requiring clocking rates that differ from clocking rates required by other processing units. A timing generator responds to a base clock and to a data valid signal, which is indicative of arrival of a portion of the interlaced video data, by causing generation of a plurality of enable signals, each of the enable signals enabling a corresponding one of the clocking rates required by the processing units.

Advantageously, the control mechanism allows processing of streams of video whose instantaneous arrival time is non-deterministic, although the averaged time over a sufficiently large time interval is determined by a real-time video specification such as CCIR 601 as specified by the International Radio Consultative Committee.

In accordance with another object of the invention, passive and active mechanisms are provided for obtaining high quality image capture using a multimedia accelerator that provides de-interlacing and enhancement in accordance with the aforementioned principles. Passive mechanisms refer to specific quantities related to picture quality that are computed and exported to external devices via readable status registers. Active mechanisms refer to programming that can be done on a frame-by-frame basis to influence the quality of the following frame or frames. Video capture embodiments employing such principles advantageously allow capture of high quality frames of video and avoid capture of frames of video that may include the presence of significant motion, and therefore appear blurry, or that occur at a scene change, or that occur at a bad edit point in the video. Such frames may go unnoticed when viewing the moving video but may be undesirable when viewed in a captured, still image.

These and other features and advantages of the present invention may be better understood by considering the following detailed description of a preferred embodiment of the invention. In the course of this description, reference will frequently be made to the attached drawings.

DETAILED DESCRIPTION OF THE PREFERRED EMBODIMENTS

Figure 1:
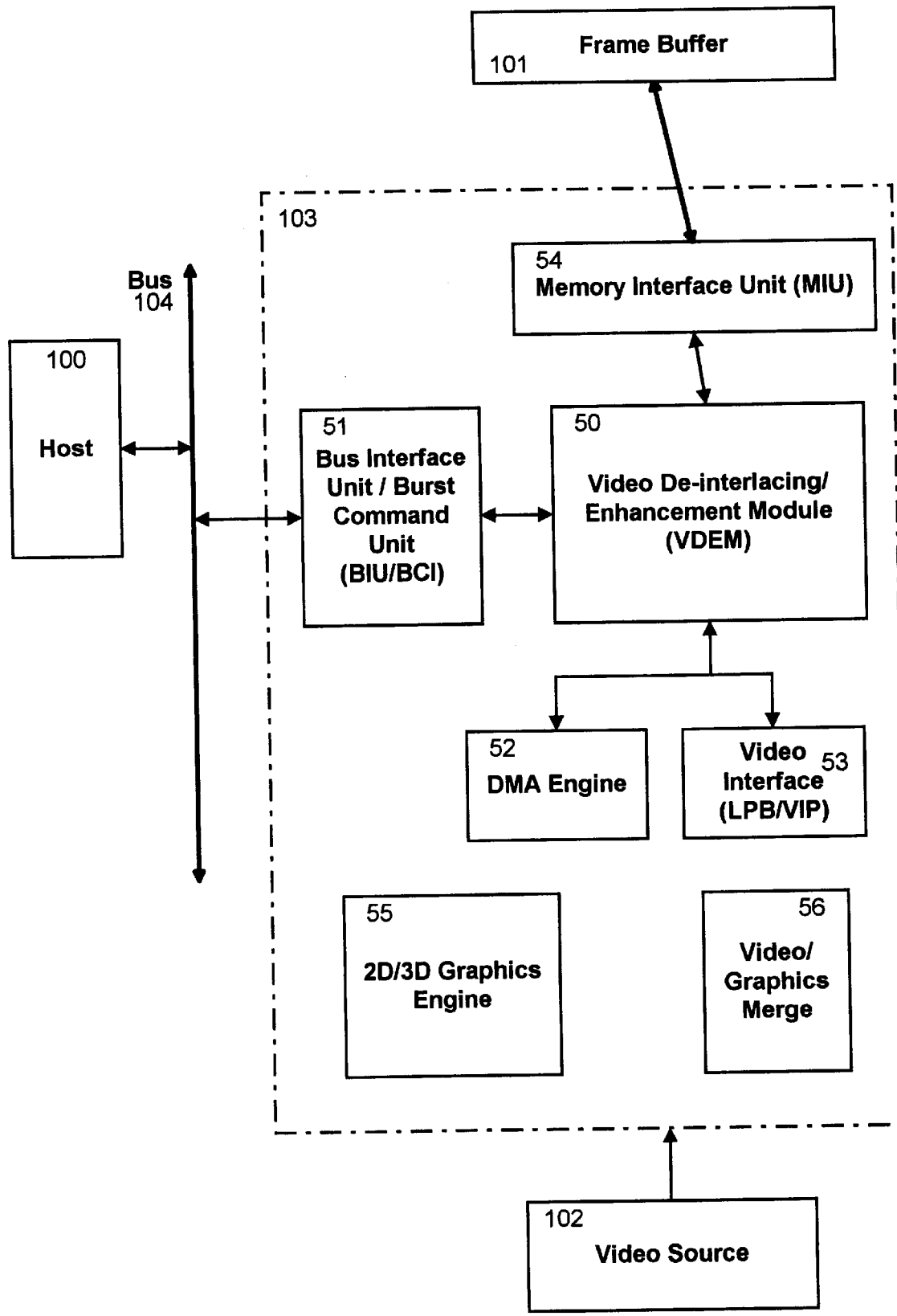
FIG. 1 is a high-level block diagram of a personal computer system employing the principles of the present invention.

FIG. 1 shows a high level view of a personal computer (PC) system that includes a PC multimedia accelerator 103 (also commonly referred to as a graphics controller), that contains a Video De-interlacing and Enhancement Module (VDEM) 50 for generating non-interlaced video data in response to interlaced video data and for enhancing the video data. The host CPU 100, communicates with the accelerator 103 through a bus or port such as PCI or AGP 104. One or more video sources 102 provide video input to accelerator 103 either through a direct video port 53 such as the Local Peripheral Bus (LPB) on the ViRGE graphics accelerator from S3 Incorporated, or via common bus such as 104. The video data can also be provided to the multimedia accelerator 103 by way of fetches initiated by the accelerator using the DMA (Direct Memory Access) engine 52. Alternatively, DMA type transfers may be initiated by the video source 102, or the CPU 100. The accelerator 103 therefore can act as either a master or a slave in data transfers. Frame buffer 101 comprises one or more DRAM memory chips that serve as the display memory for the system 100. The implementation of the frame buffer is one of design choice and can therefore take a variety of forms, such as being integrated into the same integrated circuit as one or more of the functions of the accelerator 103.

The multimedia accelerator 103 also includes graphics acceleration functions, shown by block 55, means for merging video and graphics, shown by block 56, and other functions typically found in graphics accelerators. With the exception of VDEM 50, the functions or structures shown in FIG. 1 preferably take a conventional form. The exact protocols and mechanisms used to transfer data to or from the VDEM 50 are not critical and may take a variety of forms.

Video De-Interlacing and Enhancement

Video data received by VDEM 50 may arrive in a non-deterministic manner due to use of shared resources such as the system bus 104. Video data transmitted by VDEM 50 may also be sent in a non-deterministic manner due to use of shared resources such as memory bandwidth and merging of multiple asynchronous streams, especially graphics. Moreover, effective processing of the received data requires that the VDEM 50 process the received data at different rates in its internal pipeline. For example if the CCIR 601 frequency of 13.5 MHz is referred to as 1X, VDEM 50 may have to deal with data transfer or processing rates of 0.5X, 1x, 2X, and 4X.

Figure 2:
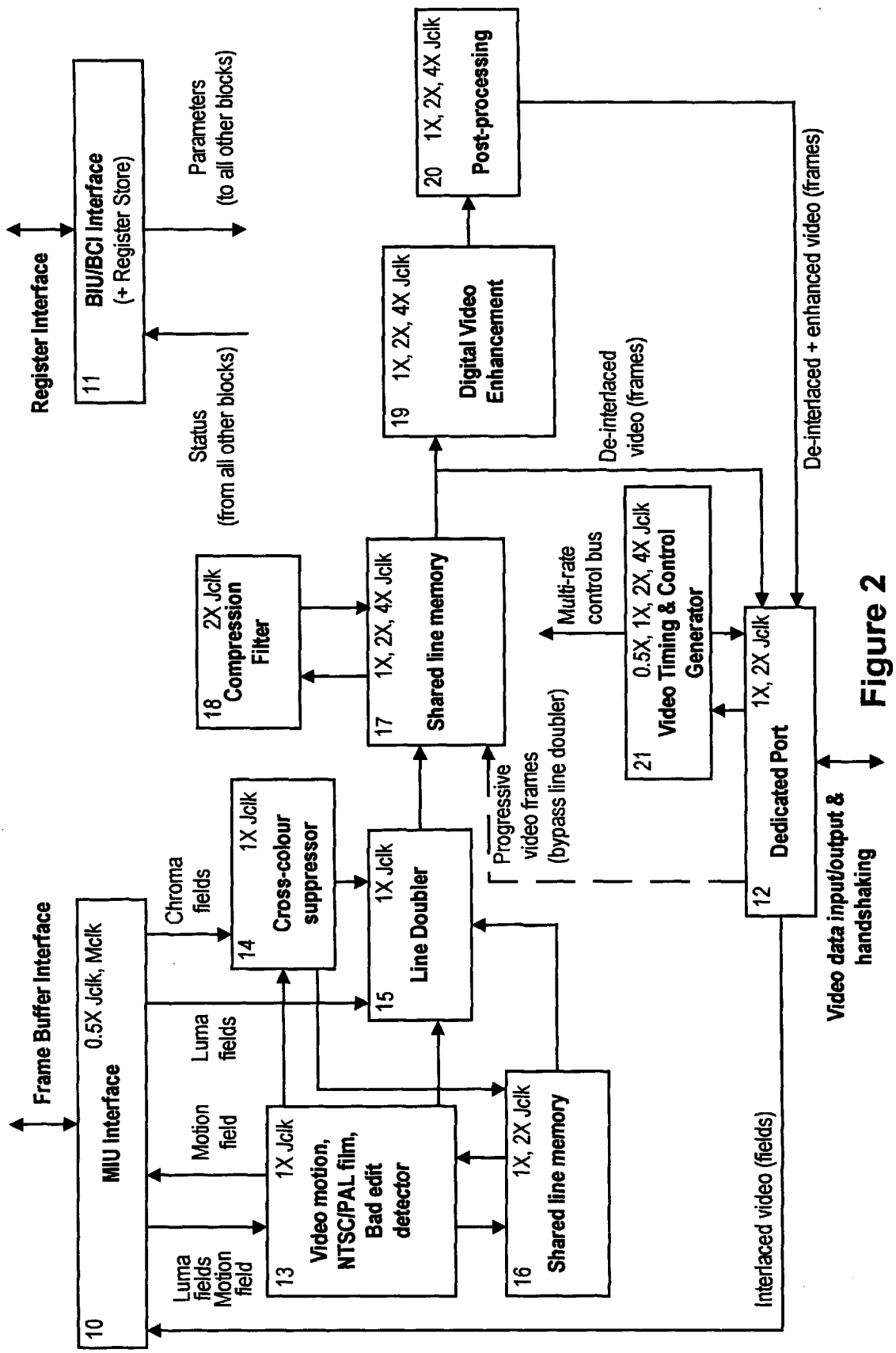
FIG. 2 is a block diagram showing further details of the video de-interlacing and enhancement module of FIG. 1.

FIG. 2 shows a top level view of a preferred embodiment of VDEM 50. Register I/O occurs through bus interface block 11 which interfaces with the system bus 104. Direct video data input and output occurs through the dedicated port 12 which provides an input port for video by interfacing with a dedicated video path such as the LPB bus mentioned in connection with FIG. 1, or receiving data received by way of DMA operations over bus 104. The dedicated port 12 also functions as an output port for the VDEM 50 to provide de-interlaced and enhanced video to the other modules within the accelerator 103. Intermediate field memory storage is provided through the MIU interface 10 which interfaces with the frame buffer 101. Module 13 performs detection of video motion, NTSC or PAL film formats, and bad edits (within a film sequence). Cross-color suppresser 14 is responsive to motion information from module 13 to perform spatio-temporal comb filtering on the chroma component of the received video to remove cross-coloring introduced in the chroma component due to overlap of luma spectral content. Line doubler 15 performs line doubling using motion-weighted spatial and temporal interpolation as described, for example, in U.S. Pat. No. 5,347,314, or in the book "Art of Digital Video" by John Watkinson, Focal Press (1994). Shared line memory 16 provides buffering for modules 13 and 15. Shared line memory 17 provides buffering for modules 15, 18 and 19. Compression filter 18 performs filtering using a conventional FIR (Finite Impulse Response) filter to remove artifacts prevalent in decompressed video streams such as those obtained from a DVD type source. Digital video enhancement module 19 performs enhancements such as artifact removal and edge sharpening using linear and nonlinear techniques that require upsampling. For example, in PAL encoded data, Hanover blinds or bars, which are artifacts caused by an error in the phase of the color sub-carrier, can be removed by module 19. Post-processing module 20 performs post-processing including downsampling of data that was upsampled by module 19. The image enhancement functions performed by the modules in FIG. 2, and the manner in which such functions are performed are merely illustrative of an exemplary embodiment. The exact image enhancement, or more generally, image processing, functions, performed by VDEM 103 can be subtracted from or added to (in addition to changing the manner in which such functions are performed) without departing from the principles of the present invention.

The modules in FIG. 2 must each process data at one or more clock rates. The rates required by each module are shown within the respective module. If the original sampling rate of the video stream is defined as 1X (for example for CCIR 601, 1X=13.5 MHz), FIG. 2 shows the various multiples of this rate that each module inside VDEM has to deal with. As shown, modules 13, 14 and 15 require a 1X clock. Modules 12 and 16 require 1X and 2X clocks. Module 10 requires a 0.5X clock. Modules 17, 19 and 20 require 1X, 2X and 4X clocks. Module 18 requires a 2X clock. Video Timing and Control Generator (VTCG) 21 provides a common time-base and control mechanism for the entire pipeline.

VDEM 50 typically operates as a data-driven slave to a video source that could be for example an LPB or VIP (Video Interface Port) module as described above in connection with FIG. 1, or a DMA engine like the MEU 52 of FIG. 1. The LPB is available on various graphics controllers available from S3 Incorporated, Santa Clara, Calif. and is described in a data book by S3 Incorporated entitled "ViRGE Integrated 3D Accelerator" (August 1996). The VIP is specified by the Video Electronics Standards Organization (VESA). Both the LPB and VIP interfaces allow a device such as an NTSC decoder/digitizer or an MPEG decoder to provide digital video to a graphics accelerator.

Figure 3:
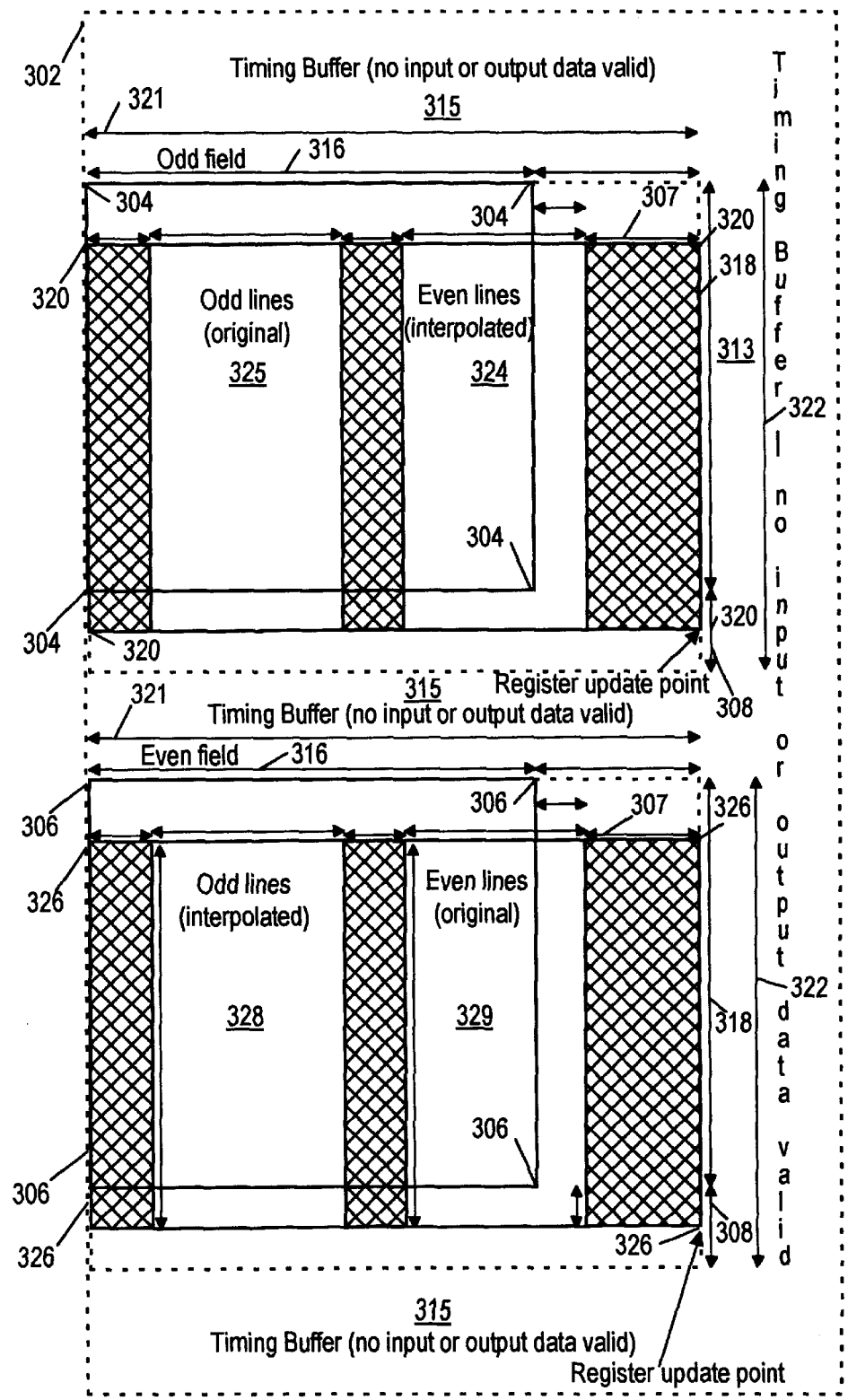
FIG. 3 is an illustration of the relationship between input and output data in a preferred embodiment.

Steady-state operation of the VDEM 50 in its most fundamental period corresponds to accepting one packet of data and returning two. This operation is repeated as long as the input data packets are provided as indicated by the occurrence of a data valid input. FIG. 3 of the drawings illustrates the relationship between an interlaced input frame of data received by the VDEM 50 and the two line-doubled output frames produced by the VDEM 50. In FIG. 3, the block 302, shown in dotted lines, represents an input frame of data which comprises an odd field of data (shown by the rectangle bounded by points 304) and an even field of data (shown by the rectangle bounded by points 306). The blocks bounded by points 320 and 326 represent output frames of data corresponding to fields 304 and 306 respectively. The output frames shown in FIG. 3 are actually time-delayed from the input frame shown in FIG. 3 because of the latency of VDEM 50 of one field. FIG. 3 only shows, for purposes of explanation, the relationship of an input frame of data and the corresponding output frames (that is generated at a later time), and does not show the input and output of the VDEM 50 at any single point in time.

The frame 320 is generated from odd field 304 by generating a set of even scan lines shown generally by rectangle 324, for each set of corresponding odd scan lines 325 that are received for the odd field 304. The frame 326 is similarly generated from even field 306 by generating a set of odd scan lines shown generally by rectangle 328, for each set of corresponding even scan lines 329 that are received for the even field 306. The even lines 324 for output frame 320 are generated by interpolation from odd lines 325. The odd lines 328 for output frame 326 are generated by interpolation from even lines 329. As can be seen from FIG. 3, receipt of an odd input field 304 by VDEM 50 results in generation of an output frame 320 of data comprising the received odd lines 325 and interpolated even lines 324. Receipt of an even input field 306 by VDEM 50 results in generation of an output frame 326 of data comprising the received even lines 329 and interpolated odd lines 328.

By way of example, for an NTSC signal, the input frame 302 has 525 scan lines and 858 pixels per line. Each field 304 and 306 has 241 active lines each with 720 active pixels per line. The output frames 320 and 326 are offset from the corresponding input fields 304 and 306 because of horizontal and vertical latency through the processing pipeline in VDEM 50. As previously noted, there is additionally one field latency between input and output that is not shown in FIG. 3. The field latency not shown in FIG. 3 is the frame that is output during the time an input field is coming in. The output frames 320 and 326 shown in FIG. 3 are actually the line-doubled outputs from the previous input field. It should also be noted that the output frames produced by the VDEM 50 are produced at twice the rate of the input (for example, 1440 pixels are output from VDEM in the time that 720 input pixels arrive).

There is some horizontal (pixel) and vertical (line) latency between VDEM input and output, in addition to the one field latency. FIG. 3 shows the effect of the horizontal and vertical latency. Each input line drives out two output lines (because of the line doubling) but some additional input padding (shown by the cross-hatched area within rectangles 320 and 326) is required to drive out both output lines because of the horizontal latency through the pipeline. After this "active+ padding" area, there is a "variable timing buffer" (shown generally at 313) between the end of the padding and the start of the next active input line. This variable timing buffer allows the data source to handle minor variations in line length typical of many analog video sources without affecting VDEM output quality. In the example shown in FIG. 3, the total input video line length is 858, but the active+ padding required by VDEM is 756. The data source, say DMA engine 52, can provide any number of active+blank input pixels as long as it is at least 760. In FIG. 3, the data source is shown to provide 760 pixels per line. Under perfect conditions for the operating mode shown in FIG. 3, a video decoder provides 858 pixels per line, resulting in an idle time corresponding to 858−760=98 pixels between each input line provided to VDEM. The timing buffer can absorb line length shortening of up to 98 pixels without affecting output quality or pixel rate. In the case of a video source supplying data over a non-deterministic channel such as the PCI bus, the timing buffer might get used instead as spaces between individual or groups of input pixels.

Some vertical padding is required because of the line latency through the pipeline, typically a few lines. Analogous to the horizontal variable timing buffer, a vertical variable timing buffer, seen generally at 315, exists between the end of the active+padding lines of one field and the start of the active portion of the next one.

Since the VDEM 50 acts as a pure slave, the data source has to drive it until all the data in the pipeline is clocked out. The number of scan lines for the odd and even fields 304 and 306 and the number of pixels for each of the scan lines, together with the horizontal and vertical offsets 307 and 308 are programmable in the VDEM 50 to allow for receipt of different formats of input signals. For example, NTSC signals have 525 scan lines and 858 pixels per frame, whereas PAL signals have 625 scan lines and 864 pixels per frame. The actual values that are programmable are as follows. A horizontal active length value, shown by arrow 316, designates the number of active pixels per scan line. A vertical active length value, shown by arrow 318, designates the number of active scan lines per input field. Horizontal and vertical offsets, shown by arrows 307 and 308, respectively, as explained above, are also programmable. A programmable horizontal operation length value, shown by arrow 321, is the sum of the horizontal active length value 316 and the horizontal offset value 307. A programmable vertical operation length value, shown by arrow 322, is the sum of the vertical active length value 318 and the vertical offset value 308.

The effect of the horizontal and vertical variable timing buffers is to allow the system to have an effective frame rate corresponding to the ideal one for the operating mode even though its instantaneous processing rate may have considerable variation. This provides the flexibility and robustness necessary for the diverse and non-real-time PC environment. For example, in certain embodiments, a multimedia accelerator may couple the VDEM 50 directly to a real-time video source while in another embodiment, the video may be supplied through a shared channel like the bus 104.

In order to facilitate tight coupling between the VDEM operation and the rest of the PC system, all operating parameters that do not affect timing and control of VDEM 50, or memory allocation, are advantageously updated at the end of each output frame (e.g. frames 320 and 326), allowing processing to be changed on each output frame boundary. Stated another way, such operating parameters include parameters that specify the manner in which the contents of the input frame is manipulated, including the enhancement functions that should, or should not, be performed. Thus, changes to the operating parameters for certain image capture functions (such as described below in conjunction with FIG. 7) are made to the VDEM 50 at the end of an output frame boundary, and determination of the status of such operating parameters by other processes is performed at the end of an output frame boundary. In a preferred embodiment, the manipulations to the input frame that can be performed include: spatio-temporal comb filtering to perform cross-color suppression; motion-adaptation during line doubling; motion-adaptation during cross-color suppression; compression to reduce storage space; motion-detection; and programmable enhancement variables, such as for image sharpness, for use by digital video enhancement module 19.

As shown in FIG. 3, the register update point, marked by the assertion of a "register_update strobe" from VTCG 21, is chosen to be the end of each output frame, instead of the end of each input field because the latter choice would effect the last few lines of the current output. The register update strobe is also used to update status and picture quality information provided by various blocks in VDEM 50 to register store (block 11 in FIG. 2). Examples of the status and picture quality information are a video motion sum value, indicative of total motion in a field, and a stall cycle value, indicative of a number of clock cycles elapsed during a stall of the VDEM 50. This information is stored in read-only registers in the VDEM register space and is accessible to external devices.

Figure 4:
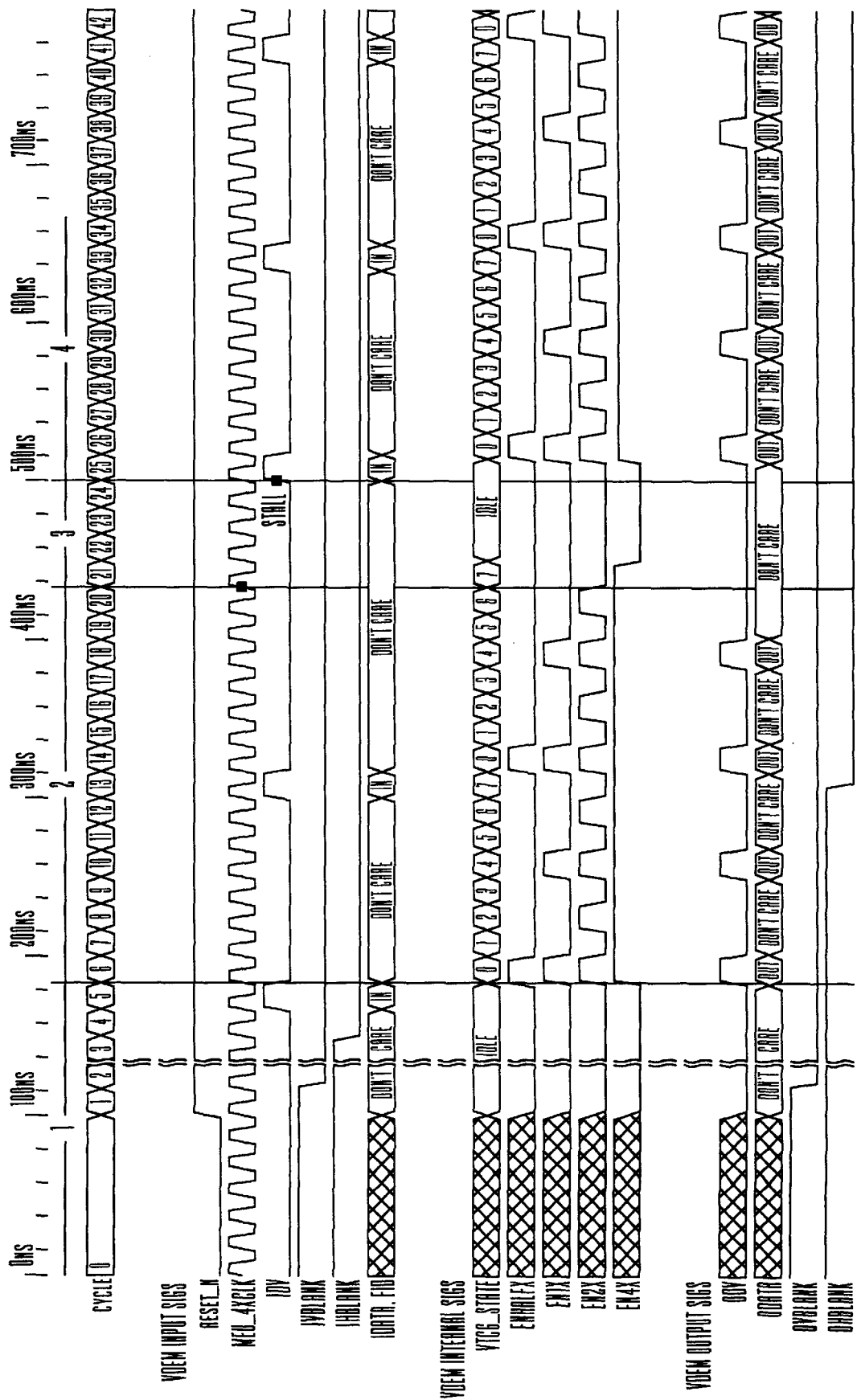
FIG. 4 is a timing diagram illustrating operation of a preferred embodiment.

FIG. 4 illustrates, by way of a timing diagram, the efficient interface between the VDEM 50 and a data source/sink, which in this particular embodiment is the DMA engine 52. The data source provides data (IDATA), qualified by a data valid signal (IDV), horizontal and vertical blanking signals (IHBLANK, IVBLANK) (to distinguish active pixels from blank), a field id (IFID) (to distinguish odd versus even), and a clock (MEU_4XCLK) corresponding to the highest multiple in VDEM 50 which is 4X in this embodiment. All synchronous logic in the VDEM processing pipeline operates with this clock. For ease of understanding, the signals IDATA and FID are shown generally as a single set of signals that are valid at certain times, indicated as "in", and in a don't care state the remainder of the time.

Figure 5:
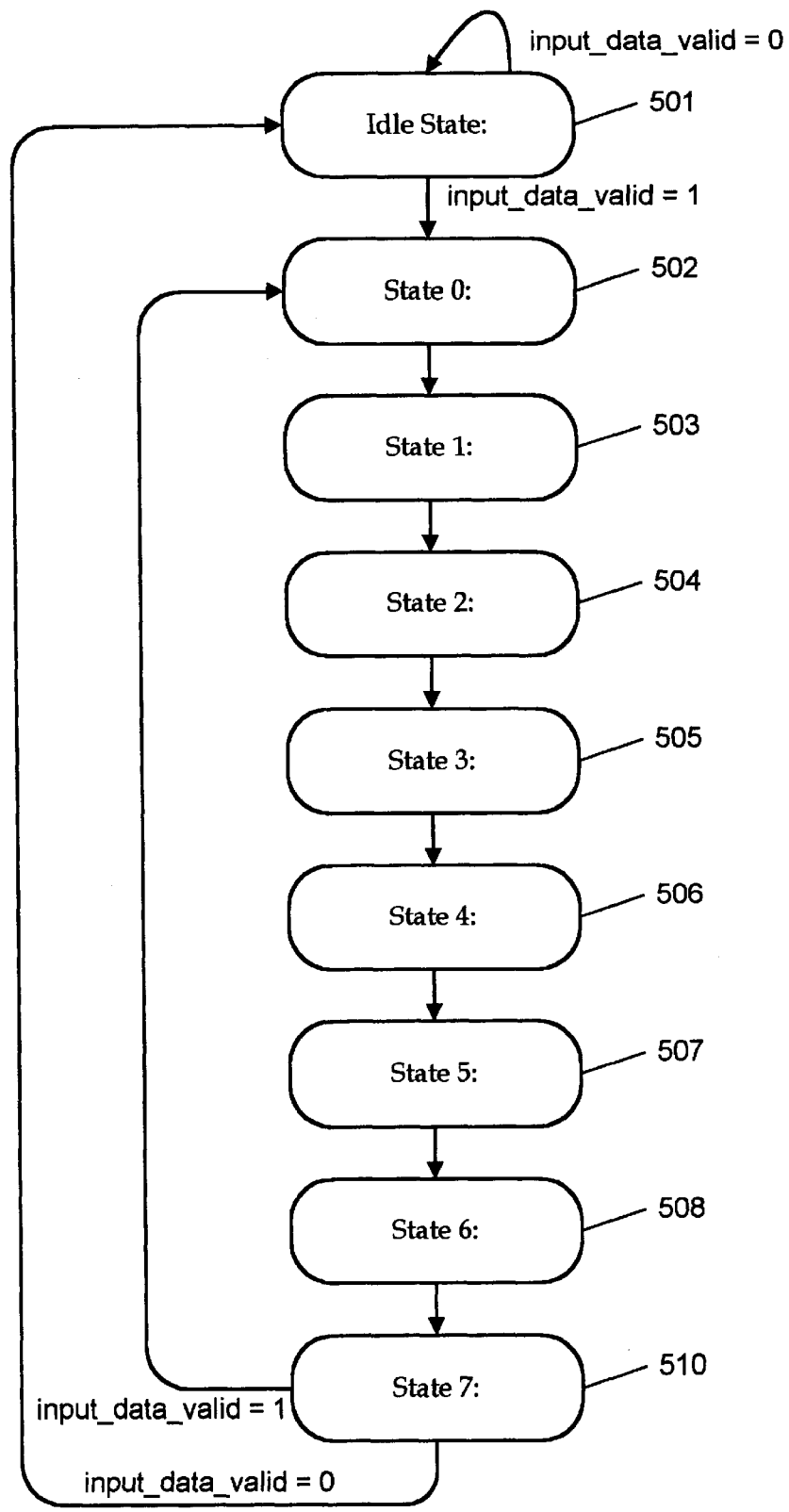
FIG. 5 is a state diagram of a state machine of a preferred embodiment.

VTCG 21 accepts signals from the data source and generates a set of multi-rate control signals that are used by the processing pipeline to move data along. The signals generated by the VTG are indicated in FIG. 4 under the heading "VDEM INTERNAL SIGS." VTCG 21 divides the fundamental period of 8 cycles of the 4X clock into eight phases, numbered 0 to 7 and shown in FIG. 4 as the signal VTG_state. The eight cycles are implemented as 8 states 502–509 of a state machine, shown in FIG. 5, which has an additional state 501 corresponding to the idle condition. The state machine is slaved to the input signal IDV, with each occurrence of the IDV signal causing the state machine to step through the eight phases. For normal uninterrupted operation, the state machine receives a new IDV signal every time it gets to state 7, causing it to generate the next eight phase periods corresponding to states 0–7. The eight states of the state machine together comprise the smallest or atomic transaction in the system, i.e., the input of 1 data packet (containing two pixels in this embodiment) and the corresponding output of two data packets (each containing two pixels in this embodiment). Each atomic (i.e. indivisible) transaction starts in state 0 after the receipt of one piece of input data (marked by the assertion of the data valid signal), and ends in state 7 after the delivery of two pieces of output data. When the state machine reaches state 7, it expects to see the data valid signal at a value of 1, if there is an uninterrupted stream of input data. If this data valid signal is not present (data valid=0), the state machine enters idle state and generation of all timing signals is stopped. The state machine remains in the idle state until the data valid signal is equal to a value of 1. States 0 to 7 are used to generate a set of enables with one for each multiple of the base data rate that is used in the VDEM 50. FIG. 4 shows the generation of the VTG states and the corresponding set of enables (0.5X, 1X, 2X, 4X) that are used in the present embodiment. These enables are used to move data between each registered module through the multi-rate processing pipeline in VDEM.

The registered modules all operate off the same clock (4XCLK), which offers considerable advantages in synthesis, timing and other back-end stages of deep sub-micron ASICs, but the data update is controlled by the corresponding enable. For example a register element in block 13 (see FIG. 2) that moves data at a 1X rate uses the 1X enable to control updates on its data input. This method of operation also provides simple and robust handoffs of data between segments operating at different rates, for example when upsampling from 2X to 4X in block 19. This method of control also provides a simple stall mechanism whenever there is a data underflow or overflow in the data source or sink, respectively. The data source in the embodiment described herein is the video source 102 or the host 100. The data sink is ultimately the frame buffer 101 which accepts data from the VDEM 50 by way of the MIU 54, which arbitrates access to the frame buffer 101 from different competing processes such as the graphics engine 55, and the host 100. Data processing in the VDEM pipeline automatically stops when input data is not available, because the data valid signal is not received in state 7 causing the VTG state machine to go to idle and preventing the generation of the next set of enables. Whenever the next data comes in with its corresponding data valid signal, the enables reappear and data movement in the pipeline resumes, as shown in FIG. 4.

The embodiment of VDEM 50 shown in FIG. 2 has no mechanism for buffering output that is not accepted by the data sink. Data overflow in the sink is therefore also handled through the data valid signal. In other words, VDEM 50 has a single stall mechanism that is used by the combined data source/sink for data underflow or overflow.

Generation of timing signals by the VTCG 21, such as output horizontal and vertical blanking (O_VBLANK and O_HBLANK), and various windowing signals (to limit motion detection to a particular area in an image) and reset signals (to clear registers) for the processing pipeline is performed by using a (horizontal) pixel counter that is incremented by the 2X enable and a (vertical) line counter that is incremented by the pixel counter. VTCG 21 does not generate control signals to the processing pipeline until it has synchronized to the input data at the first "End-of-Frame" which indicates the end of an input frame 302. After this "sync point", the horizontal counter is reset by the falling edge of each input Hblank (corresponding to the start of each input line) and the vertical counter is reset by the falling edge of each input Vblank (corresponding to the start of the active field). Since the counting is slaved to the enables, this stops automatically when input data is delayed.

Video Capture

The combination of the ability to change VDEM programming deterministically on a frame boundary and assess quality of each output frame through various quality metrics provided by VDEM advantageously provides enhanced image capture capability.

In personal computers, video capture capability is typically provided by way of the Windows operating system, specifically by way of the MCI (Media Control Interface) standard. Under the MCI standard, applications such as Mplayer, available from Microsoft Corporation or any compatible third party TV applications issue MCI commands to an MCI driver, and the MCI driver in turn controls the underlying multimedia hardware to perform functions such as playing a video or audio clip. Details of MCI commands are found in an appropriate Software Developer's Kit available from Microsoft Corporation.

Among the many services provided by the MCI is the ability to capture a still frame from a video clip. To capture a still frame implies copying the current content of the framebuffer and move it to a user specified storage area. The still frame can be either captured to a file, or be captured to the clipboard supported by the Windows operating system. MCI also provides commands for applications to specify the different control parameters associated with the capture. Control parameters such as capture file format, pixel depth, brightness and contrast are supported. Other control parameters such as the quality and algorithm used to capture the still frame are also supported.

Other more recent video standards such as the video capture driver architecture based on the Win32 Driver Model (WDM) and Directshow available from Microsoft Corporation perform in a similar way to MCI, but with additional support for new technologies such as USB (Universal Serial Bus) conferencing cameras, IEEE 1394 type digital video devices, desktop cameras and multiple video streams support.

Under the MCI Standard, the MCI_CAPTURE command can be issued by an application to capture a still frame video to a file. The desired file format, compression algorithm, and quality level associated with the capture must be previously specified by the MCI_SET or MCI_SETVIDEO command. This is achieved by monitoring the status feedback from the hardware on a per frame basis. As opposed to just randomly capturing any still frame from the video clip, the MCI driver can be instructed to examine the quality of each frame and selectively capture the ones which match the desired quality level.

Figure 6:
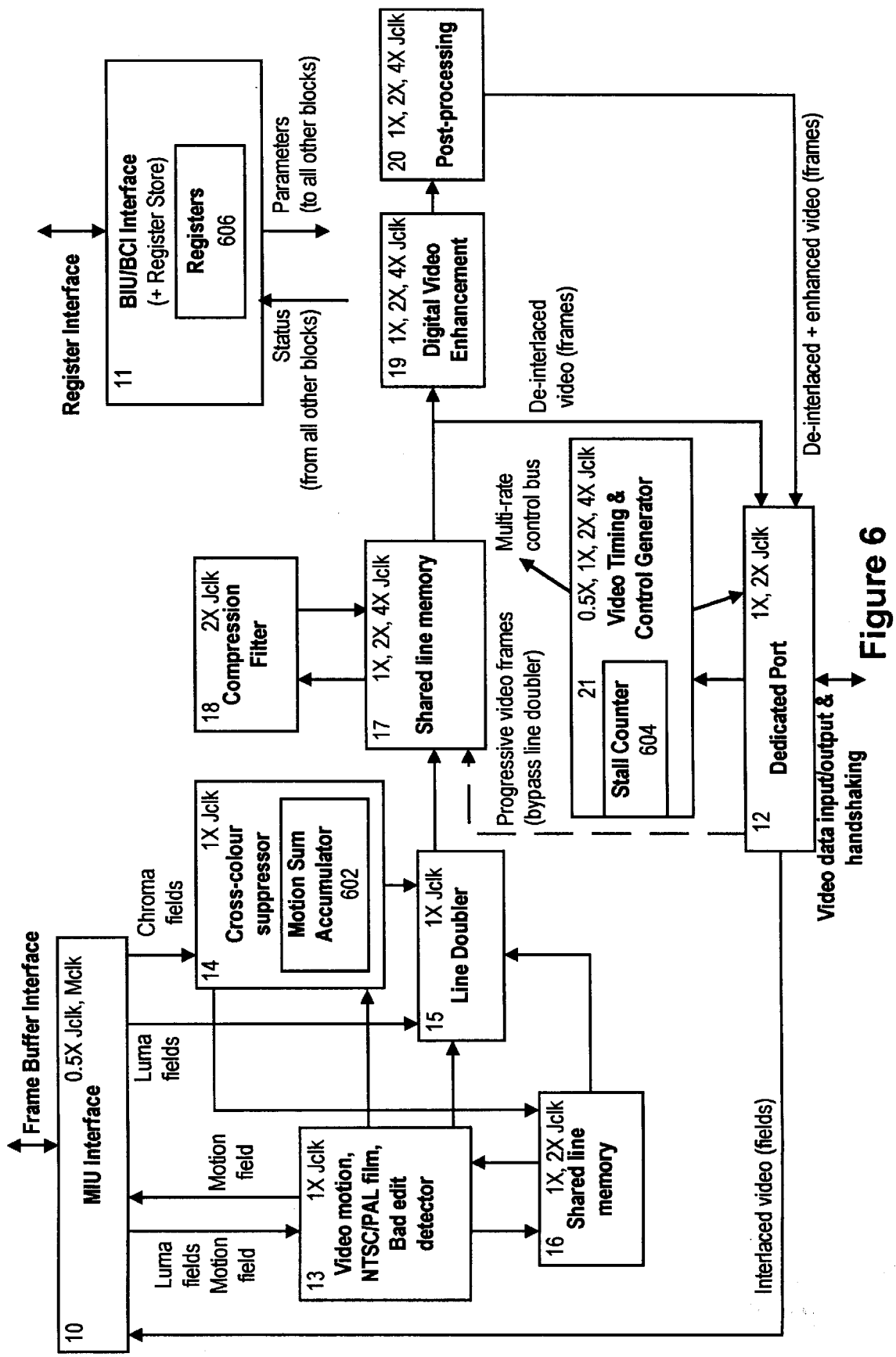
FIG. 6 is a block diagram of a second embodiment of the video de-interlacing enhancement module of FIG. 1.

FIG. 6 is a block diagram of an embodiment of VDEM 50 that supports video capture in accordance with the principles of the present invention. FIG. 6 is identical to FIG. 2 with the exception of the addition of motion sum accumulator 602 to cross-color suppressor 14, stall counter 604 to VTCG 21 and registers 606 to bus interface and register store 11. The motion sum accumulator 602 provides a total motion value for each input field which in turn directly relates to the amount of spatial versus temporal interpolation that has been done to generate the corresponding line doubled output frame. Statistical data on motion values can be collected for various sequences and used to create a subjective quality scale that maps motion value ranges to various quality levels. The stall counter 604 counts the number of clock cycles (MEU_4xclk) elapsed when the VDEM 50 stalls. This provides a measure of the throughput of the overall system, i.e. the availability of data when it is needed.

Figure 7:
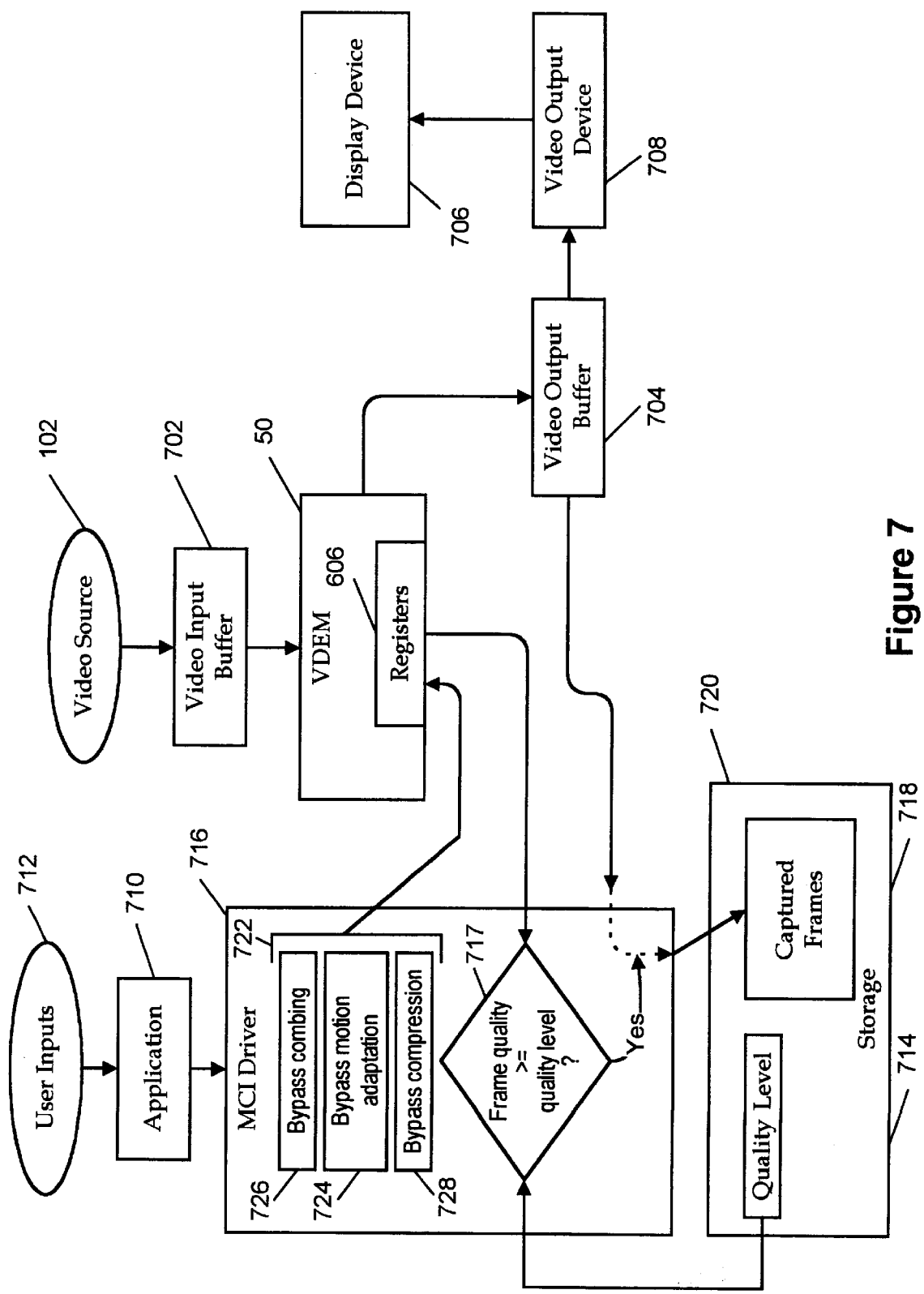
FIG. 7 is a block diagram illustrating operation of passive and active video capture in a preferred embodiment.

FIG. 7 illustrates operation of passive and active video capture in accordance with the principles of the present invention. VDEM 50 provides, in response to interlaced video data from a video source 102 (possibly buffered by buffer 702 which could be part of system memory or frame buffer memory) de-interlaced video data to a video output buffer 704 (which constitutes a part of the frame buffer memory) which in turn provides the data to a display device 706 by way of video output device 708, which performs functions such as digital-to-analog conversion. A video application 710 such as a TV applet offers the user the option of capturing frames from a sequence of a specified quality level by way of user inputs 712. The specified quality level 714 which maps to a range of motion values can be preset or user customizable. The application 710 chooses, as a function of the quality level 714, to capture specific line doubled output frames based on their motion sum value, which is indicative of a total amount of motion detected in the output frames. This is achieved by monitoring the status feedback from the hardware on a per frame basis which provides information to the driver 716, by way of a comparison 717 of the frames that meet or exceed the specified quality level 714. The information is provided to the driver 716 by way of registers 606. As opposed to just randomly capturing any still frame from the video clip, the MCI driver 716 can thus be instructed to examine the quality of each frame and selectively capture the ones which match the desired quality level. The captured frames 718 are then stored in a storage device 720 for further use.

Video contents are often associated with a certain amount of motion. A high level of motion in the video content will constitute blurry effects in the still frame captured. By instructing the MCI driver 716 to monitor the hardware status register bits which report the total amount of motion as detected by the hardware during the last input field time, the MCI driver 716 can decide to capture or not to capture the last input field by comparing the motion sum to a specified threshold. This is much superior to the current approach where a user has to simply grab a frame and hope to get a good one. This utility can be used for example by someone writing an article about a basketball game and wanting to insert a "good" still shot from the game highlights. The other status flags apply to film-originated video, where for example the MCI driver 716 ensures that frames that are grabbed have the appropriate (NTSC or PAL) film-mode status flag set and the bad edit status flag is not set. Detection of the proper film mode allows higher quality conversion by VDEM 50 of the incoming video frames by ensuring that the interlaced to non-interlaced conversion reverses the original conversion of the non-interlaced film to interlaced format. Detection of the film-mode (NTSC or PAL) is performed, preferably in a conventional manner, by module 13. The bad edit status flag indicates edits of the film-originated video, after conversion from film to video, not performed in accordance with the original film-to-video conversion. For example, NTSC formatted film, shot at 24 progressive frames per second, is converted to NTSC video for broadcast or taping by repeating one field out of every four, in a process commonly referred to as 3:2 pulldown. When the resulting video is edited, such as to insert a commercial, the 3:2 pulldown process is not always faithfully reproduced. If the correct repeating of fields is not performed, then conversion of the video from interlaced back to progressive (non-interlaced) will result in merging of the incorrect fields. Detection of such "bad-edits" allows the conversion to revert to basic spatio-temporal line doubling mode, to accommodate the differently formatted sequence.

In addition to the above described mechanism which operates passively, active mechanisms are also supported. When performing a still frame capture, the user may sometimes want to freeze the video or play the video frame by frame (which is also a form of freezing the video) to decide which video frame to capture. In this case, to remove the risk of exposing objectionable artifacts caused by motion-adaptive cross-colour suppression, the MCI driver can be instructed, as shown at 722, to bypass certain enhancement functions, such as the motion-adaptive portion 724 of the cross-color suppresser circuitry (i.e., only do spatial comb filtering) or bypass 726 the entire combing operation in the de-interlacer hardware. Since the timing & control architecture of the VTCG 21 updates parameters deterministically on each field boundary, the driver can monitor a bit that distinguishes between odd and even output frames and grab any output frame after the next one. Alternatively, information distinguishing odd and even output frames can be used to generate a hardware interrupt so that the driver can be informed every time a new output frame is available. Another example might be that the compression filtering (block 18 in FIG. 2) is desirable during video presentation since it reduces blocking artifacts that can cause twinkling, but might be less desirable for a still frame where the softness caused by its filtering is more noticeable. So the driver can be instructed to program the compression filter bypass 728 whenever the user specifies a freeze frame and grab the next output frame.

It is to be understood that the specific mechanisms and techniques which have been described are merely illustrative of one application of the principals of the invention. For example, one or more of the functions performed by the VDEM 50 may be performed in hardware, software or various combinations thereof depending upon speed, power consumption, design time and available integrated circuit technology. Numerous additional modifications may be made to the methods and apparatus described without departing from the true spirit of the invention.

What is claimed is:

1. A video deinterlacing system for receiving interlaced video data at a non-deterministic rate and for generating non-interlaced data as a function of said interlaced video data, comprising:

a plurality of processing units for processing said interlaced video data, at least some of said processing units requiring clocking rates that differ from clocking rates required by other of said processing units; and a timing generator responsive to a base clock and to a data valid signal, said data valid signal indicative of arrival of a portion of said interlaced video data, for causing generation of a plurality of enable signals, each of said enable signals enabling a corresponding one of said clocking rates required by said processing units.

2. A video deinterlacing system as set forth in claim 1 wherein said plurality of enable signals are generated as a set of sequentially occurring signals to cause said processing units to process said video data.

3. A video deinterlacing system as set forth in claim 1 wherein said plurality of processing units comprise a motion detector for detecting motion in individual frames of said video data, and wherein said video deinterlacing system further comprises means for causing capture of a frame of said video as a function of the motion detected by said motion detector.

4. A video deinterlacing system as set forth in claim 1 wherein said plurality of processing units comprise a cross-color suppressor for removing cross-coloring introduced in a chroma component of said non-interlaced video data due to overlap of luma spectral content.

5. A video deinterlacing system as set forth in claim 1 wherein said plurality of processing units comprise a line doubler for performing line doubling as a function of motion-weighted spatial and temporal interpolation.

6. A video deinterlacing system as set forth in claim 5 wherein said plurality of processing units comprise a compression filter for removing artifacts in said non-interlaced video data.

7. A video deinterlacing system as set forth in claim 1 wherein said plurality of processing units comprise a video enhancement module for performing artifact removal and edge sharpening on said non-interlaced video data.

8. A video deinterlacing system as set forth in claim 1 wherein said plurality of processing units comprise a post-processing module for downsampling of said non-interlaced video data.

9. A video deinterlacing system as set forth in claim 1 wherein said data valid signal is generated by a source of said interlaced video data and wherein deactivation of said data valid signal by said source halts operation of said processing units.

10. A video deinterlacing system as set forth in claim 9 wherein said non-interlaced data generated by said video deinterlacing system is received by a data sink and wherein said data valid signal is further generated by said data sink and wherein deactivation of said data valid signal by said data sink halts operation of said processing units.

11. A video deinterlacing system as set forth in claim 1 further comprising:

a motion detector, responsive to said non-interlaced data for detecting, frame by frame, motion in images represented by said non-interlaced data;

a motion sum accumulator, responsive to said motion detector, for storing a motion value indicative of an amount of motion in a frame;

a status register, responsive to said motion sum accumulator, for storing said motion value; and a frame capture module, responsive to a changeable motion threshold range, indicative of a desired range of motion in a frame, and to said motion value, for causing capture of said frames of video characterized by a motion value within said motion threshold range.

12. A video deinterlacing system as set forth in claim 1 further comprising:

a stall counter, responsive to stalling of said deinterlacing system, for generating a stall value, indicative of an amount of time elapsed during said stall.

13. A video deinterlacing system as set forth in claim 10 further comprising:

means for causing disabling of at least a first image enhancement function performed on said non-interlaced data.

14. A video deinterlacing system as set forth in claim 1 wherein said non-interlaced data generated by said video deinterlacing system is received by a data sink and wherein said data valid signal is generated by said data sink and wherein deactivation of said data valid signal by said data sink halts operation of said processing units.

15. A video deinterlacing system as set forth in claim 1 wherein said received interlaced video data comprises a plurality of input fields and wherein said non-interlaced data comprises a plurality of corresponding output frames and wherein parameters indicative of processing functions performed by said processing units are updated upon generation of each of said output frames.

16. A video deinterlacing system as set forth in claim 1 characterized by a predetermined number of processing states, wherein said processing states are executed upon receipt of said data valid signal.

17. A video deinterlacing system as set forth in claim 1 wherein said non-interlaced video data is time-delayed from the corresponding interlaced data by a field delay.

18. A video deinterlacing system as set forth in claim 1 wherein said non-interlaced video data is characterized by a pixel delay and a line delay from said interlaced video data.

19. Apparatus for generating de-interlaced video data in response to non-deterministically received interlaced video data, comprising:

a processing pipeline, responsive to said interlaced video data, for generating frames of said non interlaced video data in response to said received interlaced video data, said processing pipeline performing a plurality of processing functions characterized by different clocking rates, each of said clocking rates related to a base rate; and a timing control unit responsive to arrival of said interlaced video data for generating a plurality of multi-rate control signals to enable said different clocking rates.

20. Apparatus as set forth in claim 19 characterized by an effective frame rate corresponding to an effective frame of a source of said non-deterministically received interlaced video data.

21. A video frame capture system comprising:

a motion detector, responsive to input frames of video data, for frame-by-frame detection of motion in images represented by said video data;

a motion sum accumulator, responsive to said motion detector, for storing a motion value indicative of an amount of motion in a frame;

a status register, responsive to said motion sum accumulator, for storing said motion value;

jointly responsive to said motion value and a changeable motion threshold range which is indicative of a desired range of motion in a frame, capturing said frames of video characterized by a motion value within said motion threshold range; and means for disabling at least a first image enhancement function performed on said input frames of video data.

22. A method of generating non-interlaced video data from non-deterministically received interlaced video data, the method comprising:

receiving interlaced video data including a data valid signal indicative of arrival of at least a portion of the interlaced video data;

generating a base clock rate;

processing the interlaced video data at a first clock rate which is related to the base clock rate;

processing the interlaced video data at at least one other clock rate which is related to the base clock rate but different from the first clock rate; and responsive to the base clock rate and the data valid signal, generating a plurality of enable signals, each of the enable signals enabling a corresponding one of the first clock rate or the other clock rates.

23. The method of claim 22 wherein the step of generating a plurality of enable signals further comprises generating a set of sequentially occurring enable signals.

24. The method of claim 22 wherein at least one of the processing steps further comprises detecting motion in individual frames of the video data; and the method further comprises capturing at least one of the individual frames of video data as a function of the detected motion.

25. The method of claim 22 wherein at least one of the processing steps further comprises removing cross-coloring introduced in a chroma component of the deinterlaced video data due to overlap of luma spectral content.

26. The method of claim 22 wherein at least one of the processing steps further comprises line doubling as a function of motion-weighted spatial and temporal interpolation.

27. The method of claim 22 where in at least one of the processing steps further comprises removing artifacts from the non-interlaced video data.

28. The method of claim 27 wherein at least one of the processing steps further comprises edge sharpening the non-interlaced video data.

29. The method of claim 22 wherein at least one of the processing steps further comprises downsampling of the non-interlaced video data.

30. The method of claim 22 further comprising:

selectively deactivating the data valid signal to thereby halt at least one of the processing steps.

31. The method of claim 22 further comprising:

detecting, frame by frame, motion in images represented by the non-interlaced video data;

generating motion values which are each indicative of the motion detected in a given frame;

storing the motion values; and responsive to motion values falling within a changeable motion threshold range which is indicative of a desired range of motion in a given frame, capturing the frames of video data.

32. The method of claim 22 further comprising:

responsive to stalling of the method, generating a stall value indicative of the time elapsed during the stall.

33. The method of claim 31 wherein at least one of the processing steps includes enhancing the non-interlaced video data; and the method further comprises selectively disabling the step of enhancing.

34. The method of claim 22 further comprising:

receiving the non-interlaced video data generated by the deinterlacing method; and selectively deactivating the data valid signal to thereby halt at least one of the processing steps.

35. The method of claim 22 wherein the processing steps result in the generation of a plurality of output frames of non-interlaced video data, the output frames each having associated therewith process parameters indicative of the processing steps previously performed on the video data; and the method further comprises updating at least one of the process parameters upon generation of the output frames.

36. The method of claim 22 further comprising:

executing a predetermined number of processing states upon receipt of the data valid signal.

37. The method of claim 22 further comprising:

delaying the non-interlaced video data relative to the corresponding interlaced video data, the delay being a field delay.

38. The method of claim 37 further comprising:

delaying the non-interlaced video data relative to the corresponding interlaced video data, the delay being a pixel delay and a line delay.

39. A method of generating non-interlaced video data from non-deterministically received interlaced video data, the method comprising:

receiving interlaced video data;

responsive to the step of receiving interlaced video data, generating a plurality of multi-rate control signals; and responsive to the steps of receiving and generating, performing a plurality of processing functions characterized by different clocking rates to thereby create frames of non-interlaced video, each of the clocking rates being enabled by at least one of the multi-rate control signals and being related to a base clocking rate.

40. The method of claim 39 wherein the base clocking rate is related to a frame rate of the received interlaced video data.

* * * * *